United States Patent
Kotwal et al.

(10) Patent No.: US 10,877,699 B1
(45) Date of Patent: Dec. 29, 2020

(54) I/O DESTAGING BANDWIDTH CONTROL (71) Applicant: VMware, Inc., Palo Alto, CA (US)

(72) Inventors: Aditya Kotwal, Mountain View, CA (US); Christian Dickmann, Kassel (DE)

(73) Assignee: VMware, Inc., Palo Alto, CA (US)

( * ) Notice: Subject to any disclaimer, the term of this patent is extended or adjusted under 35 U.S.C. 154(b) by 22 days.

(21) Appl. No.: 16/453,453

(22) Filed: Jun. 26, 2019

(51) Int. Cl.
G06F 3/06 (2006.01)

(52) U.S. Cl.
CPC .......... G06F 3/0659 (2013.01); G06F 3/0611 (2013.01); G06F 3/0673 (2013.01)

(58) Field of Classification Search
None
See application file for complete search history.

(56) References Cited

U.S. PATENT DOCUMENTS

| 8,402,226 | B1* | 3/2013 | Faibish | G06F 12/0804 |
| | | | | 711/143 |
| 2015/0248244 | A1* | 9/2015 | Seo | G06F 3/064 |
| | | | | 711/103 |
| 2017/0153845 | A1* | 6/2017 | Oe | G06F 3/0611 |
| 2018/0267737 | A1* | 9/2018 | Oe | G06F 3/0649 |

* cited by examiner

Primary Examiner — Tracy C. Chan (57) ABSTRACT

Destaging data from a first tier data store to a second tier data store can be performed periodically and concurrently while processing user I/O operations. Each round of destaging can be delayed by certain amount (sleep time). A throttling factor can be used to compute the sleep time as a fraction of a base sleep time. The throttling factor can vary based on the usage level of first tier data store, and can be used to determine the destage frequency.

20 Claims, 7 Drawing Sheets

I/O DESTAGING BANDWIDTH CONTROL

BACKGROUND

In order to provide high I/O throughput, storage arrays typically store the data for write I/O operations in a cache and immediately acknowledge a successful write completion to the user that issued the I/O operation. The writes can then be destaged to disk asynchronously in a background process that is transparent to user. When the number of I/O operations reach a certain limit where the user is writing faster than the back-end can destage the cached data, the result is a write pending state where subsequent write I/O's have to wait until destaging can free up enough space in the cache. In other words, the I/O operation is not immediately acknowledged. This causes in an increase in the write time, resulting in performance issues since the user has to wait for their I/O operation to be acknowledged.

For example, the Vmware® vSAN™ storage array writes foreground data to a high speed data store, e.g., solid state drive (SSD), sometimes referred to as a "first tier" data store. Concurrently, a background thread (elevator process) moves the data to a slower more capacious "second tier" data store, e.g., high capacity SSDs, hard disk drives, and the like. Customers using the storage array want the highest throughput for foreground writes as they can get, while not experiencing unpredictable changes in throughput. At the same time, destaging data from the first tier to the second tier requires processor bandwidth that can slow foreground processing of write operations.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
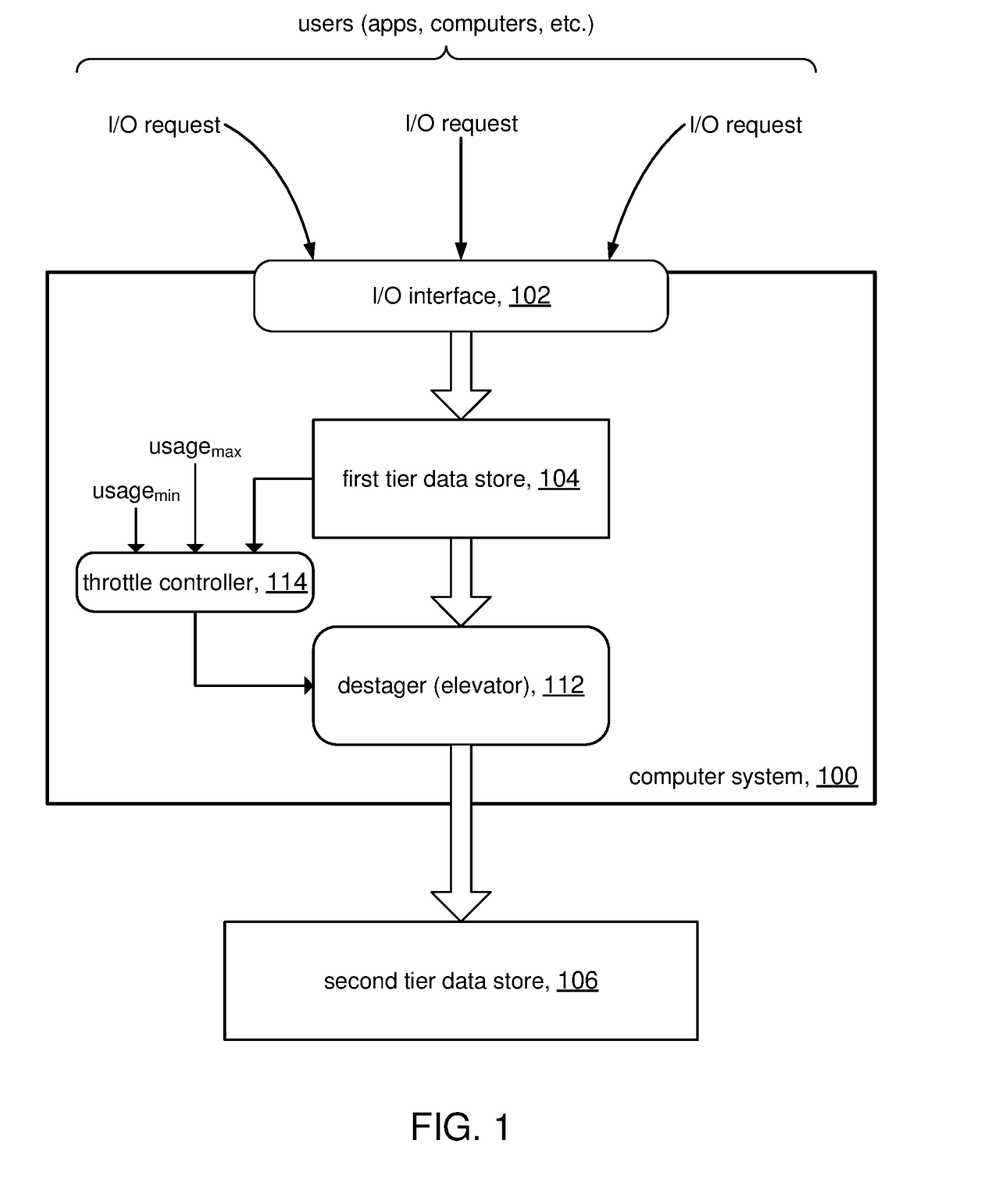
FIG. 1 shows a system in accordance with some embodiments of the present disclosure.

FIG. 1 shows an illustrative computer system 100 configured with a facility to process I/O operations in accordance with the present disclosure. In some embodiments, for example, computer system 100 can be a sever machine, such as a database server, a web server, a file server, and so on. In other embodiments, computer system 100 can be a host machine to support the execution of virtual machines in a virtualization environment. Computer system 100 can be a virtual storage system (e.g., storage array), and so on.

Computer system 100 can include a suitable I/O interface 102 to receive I/O operations (read/write) from users of the computer system. In some embodiments, for example, I/O operations can be database access operations, web page access operations, file access operation, and so on. In other embodiments, I/O operations can be user operation, I/O from physical or virtual machines, application I/O, and so on. Accordingly, "users" can refer to human users, applications, virtual machines, other computer systems, and so on.

The I/O interface 102 can read and write from a first tier data store 104. In some embodiments, the first tier data store can be apportioned into two areas: a read buffer and a write buffer. The first tier data store 104 can be any suitable high speed storage in order reduce I/O response times for I/O operations. In some embodiments, for example, the first tier data store 104 can be a high speed solid state drive (SSD). The high I/O speed of first tier data store 104 comes at a higher cost and so as a practical matter is likely to be limited in storage capacity.

Computer system 100 can include a slower but lower cost second tier data store 106. While the first tier data store 104 is used largely to provide high I/O throughput, the higher storage capacity of the second tier data store 106 can serve as a more permanent location for users' data. Examples of second tier data store 106 include, but are not limited to, high capacity SSDs, hard disk drives (HDDs), optical storage, storage arrays systems, and so on.

Since first tier data store 104 has limited storage capacity, storing data in response to I/O write operations will eventually fill up the first tier data store. Accordingly, computer system 100 can include a destager process 112 that can be periodically activated to move data from the first tier data store 104 to the second tier data store 106 in a process referred to as "destaging." The destager process 112 (also referred to as an "elevator" process) can execute as a background process, task, or thread in computer system 100. The destaging process can execute periodically and concurrently while the computer system 100 receives and processes I/O operations.

When the destager process 112 is destaging data from first tier data store 104, the processing unit (not shown) in computer system 100 may not be able to process concurrent incoming user I/O operations. This can result in unpredictable changes in I/O throughput, from the perspective of the user. Accordingly, computer system 100 can include a throttle controller 114 to vary the frequency of activation (throttle) the destager process 112 in accordance with the present disclosure. In some embodiments, the throttle controller 114 can use threshold values $usage_{min}$, $usage_{max}$ to control how often data is destaged.

Figure 2:
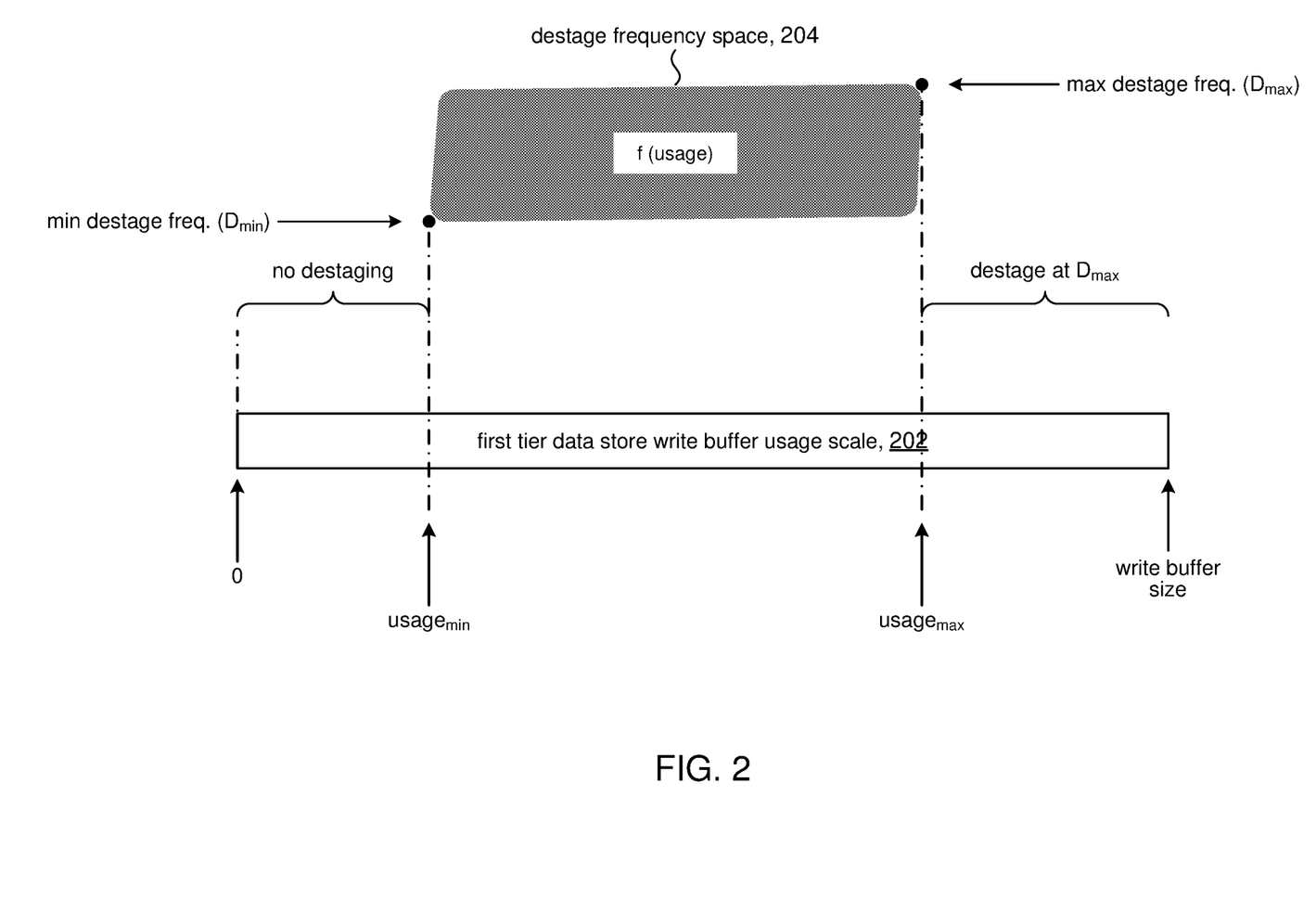
FIG. 2 represents destaging in accordance with some embodiments of the present disclosure.

FIG. 2 illustrates the throttling behavior provided by throttle controller 114 on the destager process 112 in accordance with the present disclosure. In some embodiments, for example, the throttling behavior can be expressed in terms of how often the destager process 112 is activated, referred to herein as destage frequency $D_{freq}$ or destage rate. FIG. 2 shows a usage scale 202 that represents how much of the first tier data store 104 is being used, and in particular how much of the write buffer portion of the first tier data store is being used. The minimum usage and maximum usage thresholds, $usage_{min}$, $usage_m$, divide the usage scale 202 into several regions. In some embodiments, for example, when the level of usage of the first tier data store is less than $usage_{min}$ (e.g., when the amount of data stored in the write buffer of the first tier data store is less than $usage_{min}$) the first tier data store can be deemed to have sufficient free space to store data contained in I/O write operations without risk impacting I/O throughput with a sudden burst of destaging activity. Accordingly, in some embodiments, the destager process 112 can be disabled in this region, allowing for the processing of I/O operations to proceed with an acceptably low risk of processor resources being diverted for destaging operations.

In the region between $usage_{min}$ and $usage_m$, destaging operations can occur. In accordance with some embodiments, the destage frequency can vary as a function of the level of usage of the first tier data store; i.e., how much of the first tier data store is being used. For example, when the usage is at $usage_{min}$, the destage frequency (rate) can be set to a minimum number of times the destager process 112 is activated per unit of time, $D_{min}$. The destage frequency can increase as usage increases, until at the other end of the usage scale, where the amount of storage in use is at $usage_{max}$, the destage frequency can be set to a maximum number of times that the destager process 112 is activated per unit of time, $D_{max}$. The values for $D_{min}$ and $D_{max}$ can be set by a system administrator, for example. For usage levels between $usage_{min}$ and $usage_{max}$, the destage frequency can vary between $D_{min}$ and $D_{max}$. The range of possible destage frequencies is illustrated by the destage frequency space 204. In the region beyond $usage_{max}$, the destage frequency can be fixed at $D_{max}$.

Figure 3A:
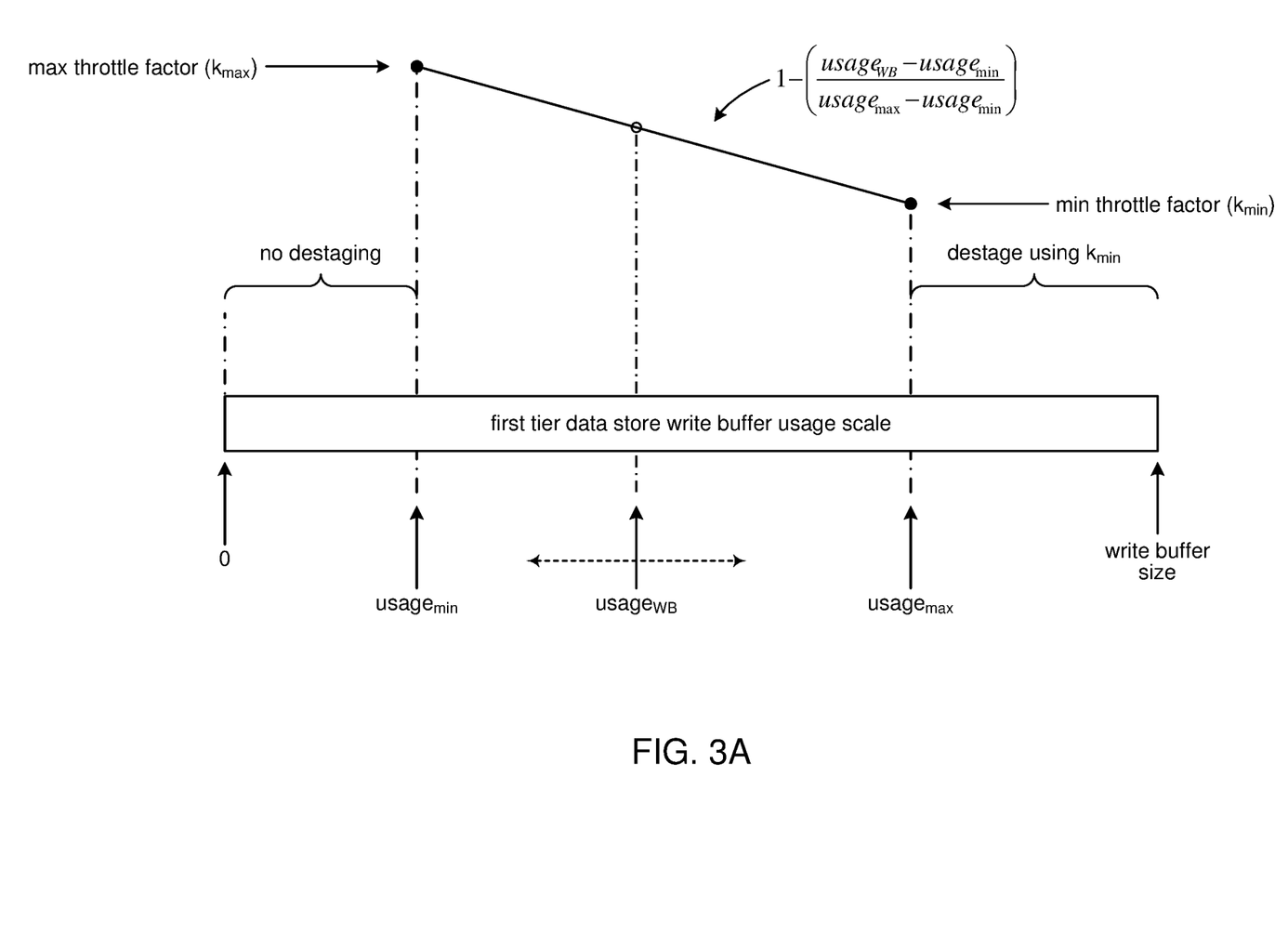
FIGS. 3A and 3B show details for destaging in accordance with some embodiments of the present disclosure.

Referring to FIG. 3A, the discussion will now turn to a description of how the destage frequency, $D_{freq}$, can be computed in accordance with the present disclosure when usage of the first tier data store is between $usage_{min}$ and $usage_{max}$. In some embodiments, for example, the throttle controller 114 can use a throttling factor (metric) k to vary the destage frequency; i.e., the destage frequency is based on k. In some embodiments, for example, the throttling factor k can be a fractional value that varies between 1.00 and 0.00. Generally, the destage frequency $D_{freq}$ can be inversely proportional to the throttling factor:

$$D_{freq} \sim 1/k \qquad \text{Eqn. (1)}$$

Thus, destage frequency increases as the throttling factor decreases and conversely the destage frequency increases as the throttling factor increases.

More specifically, in some embodiments, the destage frequency can relate to the throttling factor k as a quadratic function of k; for example:

$$D_{freq} = f\left(\frac{1}{k^2}\right). \qquad \text{Eqn. (2)}$$

In a particular embodiment, for instance, the destage frequency $D_{freq}$ can be computed according to the following:

$$D_{freq} = \frac{1}{L + Sk^2}, \qquad \text{Eqn. (3)}$$

where
L is destage latency,
S is a base sleep time, and
k is the throttling factor.

Destage latency L refers to the time it takes for the destager process 112 to perform a single round of destaging. The latency L may vary from one round of destaging to another, depending on how much data was destaged in the round.

The base sleep time S refers to the sleep time (delay) between each round of destaging. In some embodiments, for example, when the destager process 112 completes a round of destaging, the process can go to sleep (suspend execution) for some period of time. In accordance with the present disclosure, the base sleep time S sets the maximum sleep time between destaging rounds and the sleep time can be can be varied according to the throttling factor k.

FIG. 3A illustrates how the throttling factor k can be determined in accordance with some embodiments. In some embodiments, for example, the throttling factor k can be determined based on the level of usage of the first tier data store 104, and can vary from k=1.00 (full throttle), where the destager process operates at the slowest rate, to k=0.00 (no throttling), where the destager process operates at maximum frequency. For example, when the write buffer in the first tier data store is at $usage_{min}$, then k can be set to 1.00 to fully throttle the destager process, and when the write buffer in the first tier data store is at $usage_{max}$, then k can be set to 0.00 to disable throttling the destager process. In some embodiments, the throttling factor k can vary linearly between $usage_{min}$ and $usage_{max}$. For example, throttling factor k can be computed according to the following:

$$usage_{WB} < usage_{min}$$

k is not applicable because destaging is disabled, $$usage_{min} \leq usage_{WB} \leq usage_{max} \qquad \text{Eqn. (4)}$$

$$k = 1 - \left(\frac{usage_{WB} - usage_{min}}{usage_{max} - usage_{min}}\right)$$

$$usage_{WB} > usage_{max}$$

$$k = 0.00,$$

where
$usage_{WB}$ is the amount of the write buffer (e.g., usage level) in the first tier data store that is used, and can be expressed as a percentage of the total size of the write buffer,
$usage_{min}$ is the minimum amount of the write buffer that will enable destaging expressed as a percentage of the total size of the write buffer,
$usage_{max}$ is the maximum amount of the write buffer, expressed as a percentage of the total size of the write buffer, after which destaging will run at full speed (i.e., no throttling).

Figure 3B:
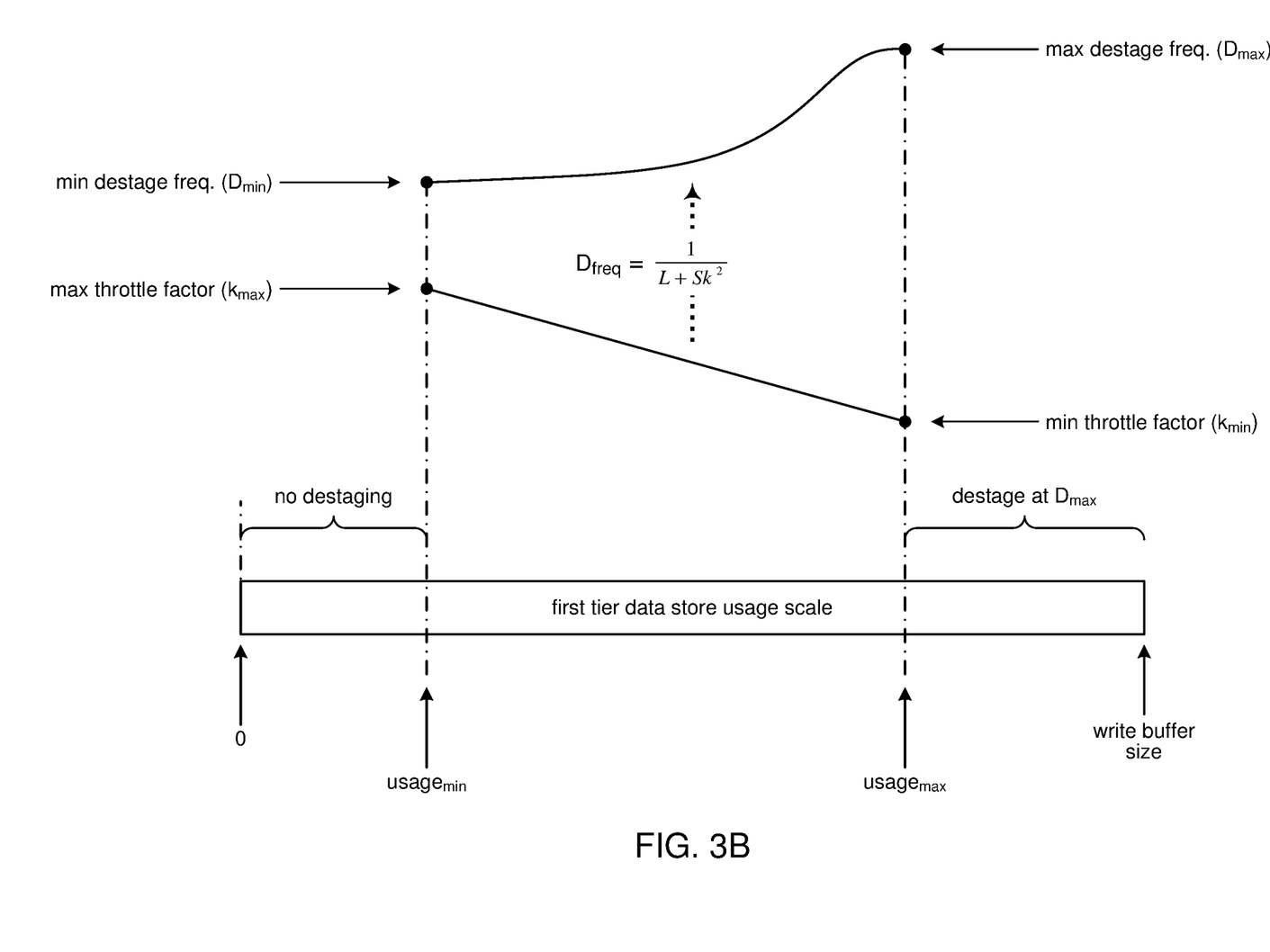

FIG. 3B shows a graphical representation that relates the throttling factor k to the destage frequency in accordance with Eqn. 3. It can be appreciated from the figure that the quadratic term $k^2$ generates a quasi-linear response curve where the destage frequency can be controlled to track changes in the usage level in the first tier data store. The quasi-linear nature of the response provides accurate tracking of changes to usage level.

Figure 3C:
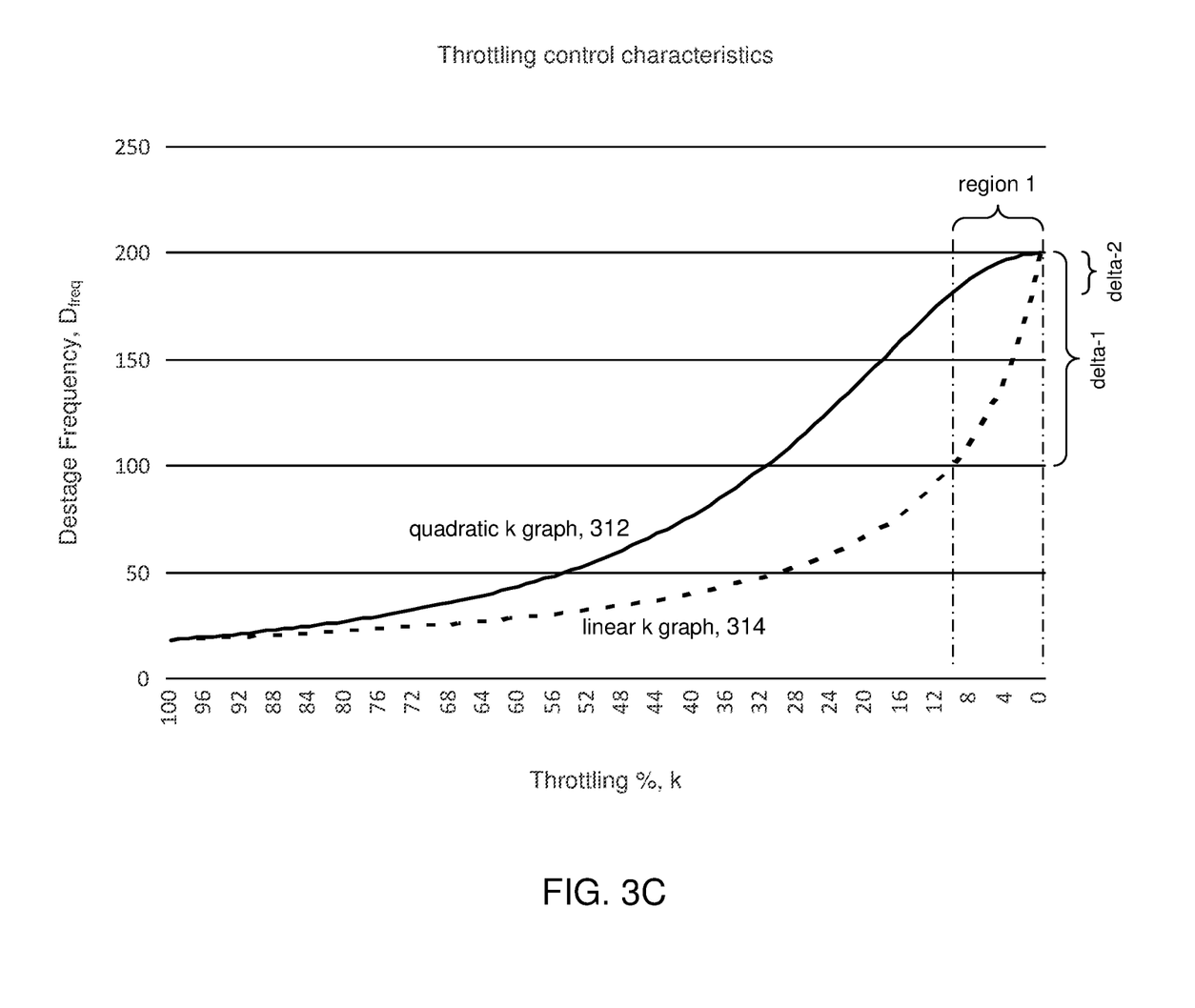
FIG. 3C illustrates a comparison of destaging performance.

To illustrate, FIG. 3C shows a comparison between a configuration that uses a linear term in k and a configuration that uses a quadratic term in k. Graph 312 represents the destage frequency as a function of a quadratic k term and graph 314 represents the destage frequency as a function of a linear k term. More specifically, graph 312 is defined as:

$$D_{freq} = \frac{1}{L + Sk^2},$$

and graph 314 is defined according to:

$$D_{freq} = \frac{1}{L + Sk},$$

where
L is destage latency and in this particular example is set to 5 ms for discussion purposes,
S is a base sleep time and is set to 50 ms for discussion purposes, and
k is the throttling factor, which is expressed as a percentage (%).

The throttling factor k serves as a control knob to vary the destage frequency. The throttling factor k can be adjusted after each round of destaging to approximate users' I/O rates in order to match the destaging frequency to the users' I/O activity. Referring first to graph 314, when the control knob (throttling factor k) varies linearly, the graph shows that the destage rate in region 1 is sensitive to changes in the throttling factor where small changes in the throttling factor can produce large changes (delta 1) in the destage frequency. This high sensitivity can result in unstable operation creating wide swings in destage frequency as the system attempts to track the users' I/O. This can manifest itself in sporadic decreases in I/O throughput due to sudden onsets of destaging activity.

By comparison with reference to graph 312, when the throttling factor k varies in quadratic fashion, the graph shows that the destage frequency in region 1 is less sensitive to the throttling factor and varies more gradually and over a smaller range (delta-2) to changes in the throttling factor than with graph 314. Graph 312 shows that a quadratic throttling factor can provide a more fine-grained control of the destage frequency to match more closely to incoming I/O, and thus improve overall performance in I/O throughput.

The following table illustrates this difference using numerical values computed for region 1:

TABLE

| throttling, k (%) | $D_{freq}$, linear k | $D_{freq}$, quadratic k |
|---|---|---|
| 10 | 100 | 181.8181818 |
| 9 | 105.2631579 | 185.013876 |
| 8 | 111.1111111 | 187.9699248 |
| 7 | 117.6470588 | 190.6577693 |
| 6 | 125 | 193.0501931 |
| 5 | 133.3333333 | 195.1219512 |
| 4 | 142.8571429 | 196.8503937 |
| 3 | 153.8461538 | 198.2160555 |
| 2 | 166.6666667 | 199.2031873 |
| 1 | 181.8181818 | 199.8001998 |
| 0 | 200 | 200 |

The table shows that changes in the destage frequency in region 1 are significantly more pronounced for a linearly varying throttle factor than for a quadratic throttle factor.

In accordance with some embodiments, the destager process 112 can be a process, task, or thread that executes on computer system 100 and performs a round of destaging. The destager process 112 can suspend execution (sleep) for a period of time, and then repeat the cycle with another round of destaging; for example:

destage (round 1)→sleep→destage (round 2)→sleep→destage (round 3)→ . . . .

The throttle controller 114 can control the frequency or rate of destaging by adjusting the sleep time between rounds. The discussion will now turn to a description of these aspects of the present disclosure.

Figure 4:
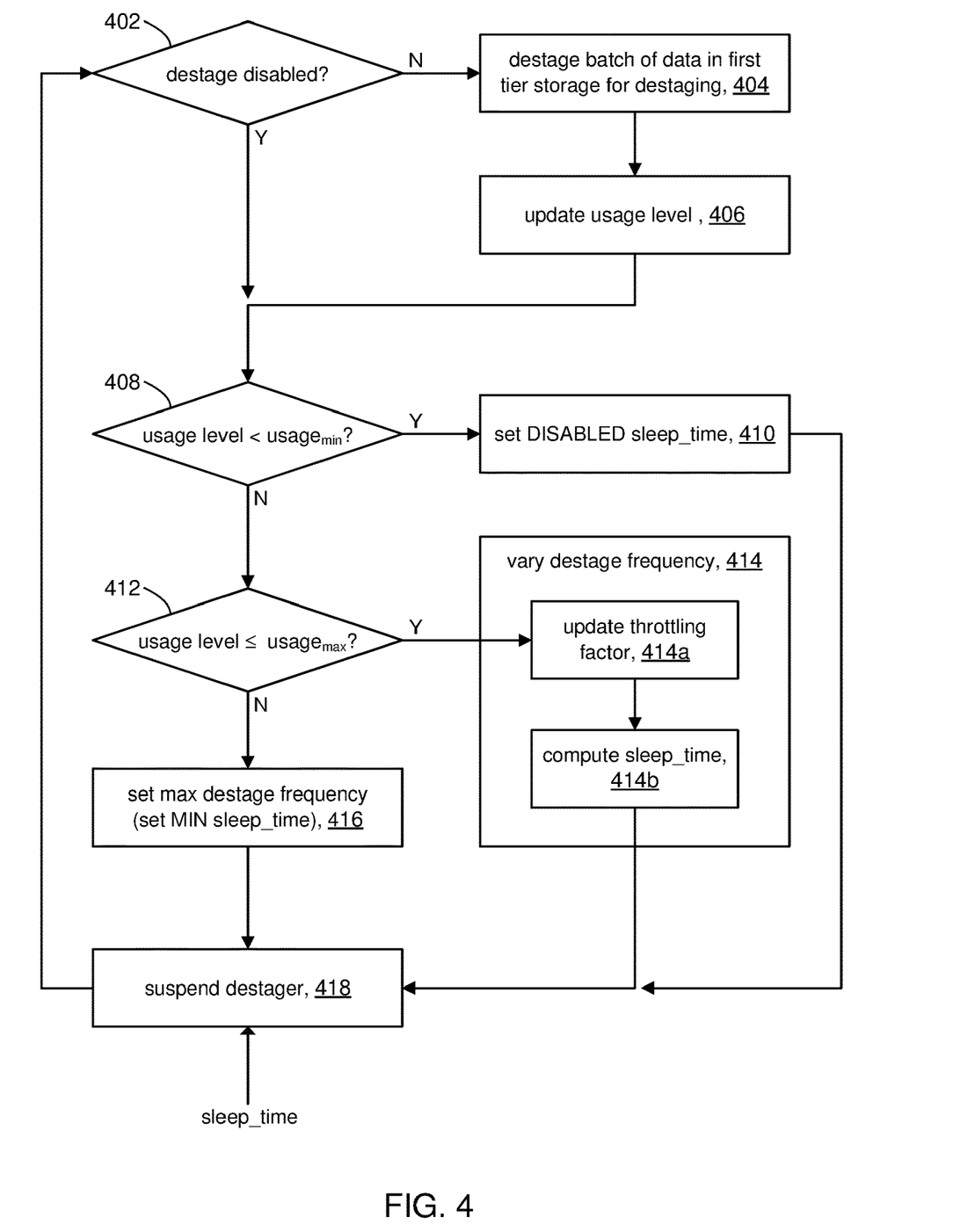
FIG. 4 shows destaging operations in accordance with some embodiments of the present disclosure.

FIG. 4 depicts a high level description of processing by the destager process 112 and the throttle controller 114 to destage data from the first tier data store 104 in accordance with the present disclosure. In some embodiments, for example, the computer system 100 can include computer executable program code, which when executed by a processor (e.g., 502, FIG. 5) in the computer system can cause the processor to perform operations in accordance with FIG. 4. The flow of operations is not necessarily limited to the order of operations shown in the figure.

At operation 402, the destager process 112 can determine whether destaging is disabled or not. In some embodiments, for example, a global DISABLED flag can be used to indicate if destaging is disabled (e.g., flag is set to '1') or not disabled (e.g., flag is set to '0'). If destaging is enabled, then processing can proceed with operation 404, otherwise processing can continue with operation 408.

At operation 404, destaging is deemed enabled. The destager process 112 can initiate a round of destaging by identifying a batch of data in the first tier data store 104 and writing the identified batch of data to the second tier data store 106. In some embodiments, the destager can target data in the write buffer portion of the first tier data store for destaging. In other embodiments, data in both the read buffer and write buffer portions of the first tier data store can be targeted for destaging.

In some embodiments, data can be organized in the first tier data store in the order of a global physical offset that the data will have once it is destaged to the second tier data store. Data can be destaged in this order, in order to facilitate achieving locality of data once it is destaged to the second tier data store. In some embodiments, for example, a batch of data for destaging can be identified as a scatter-gather array of chunks of data. Each data chunk can be associated with a global physical offset that identifies a location in the second tier data store and a size of the chunk. A batch of data can comprise a number of data chunks totaling up to 512 KB in size. The batch of data can be destaged by writing the data chunks in the batch to the appropriate location in the second tier data store.

At operation 406, the destager process 112 can update an indicator that represents the level of usage in the first tier data store (e.g., the write buffer, or both the read and write buffers) based on the amount of data that was destaged.

At operation 408, the throttle controller 114 can determine whether the level of usage in the first tier data store falls below a lower bound threshold. At some point, the level of usage may be sufficiently low that the penalty for performing destaging (i.e., reduced I/O throughput) is no longer justified. In other words, there can be a point where there is sufficient space in the first tier data store that the risk of filling the buffer with destaging turned off is deemed to be small enough to justify disabling destaging in order to improve I/O throughput. Accordingly, in some embodiments, a lower bound threshold, usage$_{min}$, can be set. When the usage level is less than usage$_{min}$, the throttle controller 114 can disable the destaging process, for example, by setting the DISABLED flag to '1', and processing can proceed to operation 410. On the other hand, when the usage level is greater than or equal to usage$_{min}$, destaging can be allowed to proceed. The throttle controller 114 can set the disabled flag to '0', and processing can proceed to operation 412.

At operation 410, destaging is disabled. The throttle controller 114 can set a sleep_time attribute for the destager process 112. As noted above, in accordance with the present disclosure, the destager process 112 suspends execution between destage rounds based on the sleep_time attribute. It will become apparent that different sleep times can be used to suspend the destager process under different circumstances. For instance, when destaging is disabled, the sleep_time attribute can be set to a DISABLED sleep time value. This aspect of the present disclosure is discussed further below.

At operation 412, the throttle controller 114 can determine whether the level of usage in the first tier data store is less than or equal to an upper bound threshold, usage$_{max}$. If the level of usage is less than or equal to usage$_{max}$, then processing can proceed to operation 414; otherwise, processing can proceed to operation 416.

At operation 414, the throttle controller 114 can vary the destage frequency. At this point, the usage level is greater than usage$_{min}$ and less than or equal to usage$_{max}$, and so destaging can proceed. More specifically, the frequency of destaging can proceed according to the level of usage. In some embodiments, for example, the destage frequency can be based on a throttling factor, k. At operation 414a, for example, in some embodiments the throttle controller can compute the throttling factor, k, using Eqn. 4. At operation 414b, the throttle controller can compute the sleep_time attribute using the throttling factor according to the following:

$$\text{sleep\_time} = S \times k^2, \quad \text{Eqn. (5)}$$

where S is a base sleep time value, and k is a value between 0.00 and 1.00. Merely for illustrative purposes, and to provide a sense of the time scales involved, S can be 50 ms. The computed sleep time varies from 0.00 ms to the base sleep time S. Processing can continue at operation 418 with the computed sleep_time attribute.

At operation 416, the usage level is greater than usage$_{max}$. In this situation, destaging can proceed at a maximum frequency. Accordingly, the throttle controller 114 can set the sleep_time attribute to a minimum value (MIN). In some embodiments, for example, the MIN sleep time value can be set to 0.

At operation 418, the destager process 112 can suspend execution for a period of time, based on the sleep_time attribute, before proceeding with the next round of destaging. In some embodiments, for example, the destager can use the sleep_time attribute as a parameter in a system call (e.g., sleep( )) to suspend execution. Three kinds of sleep time values are described above, and their applicability will now be discussed.

The sleep time value computed at 414b is applicable when destaging is enabled, and in particular applies when the usage level is between usage$_{min}$ and usage$_{max}$, for example:

$$\text{usage}_{min} \leq \text{usage level} \leq \text{usage}_{max}.$$

In some embodiments, the sleep time value can vary in the range according to Eqn. 5 described above, and hence the destage frequency can be varied according to the usage level in the first tier data store.

The MIN sleep time value set at 416 may be applicable when the usage level exceeds usage$_{max}$. In some embodiments, the sleep time value is set to 0 so that the destager process can run at maximum frequency with no delay between destage rounds. This behavior can be deemed suitable when the usage level exceeds usage$_{max}$.

The DISABLED sleep time value set at 410 may be applicable when the usage level is below the usage$_{min}$ threshold value and destaging is disabled. Although destaging is disabled, the destager process 112 nonetheless continues to execute in the event that the usage level exceeds usage$_{min}$, and destaging is reactivated. In the disabled state, the destager process 112 can periodically probe the DISABLED flag to determine when destaging is enabled. The DISABLED sleep time value can set how frequent the check is made.

Figure 5:
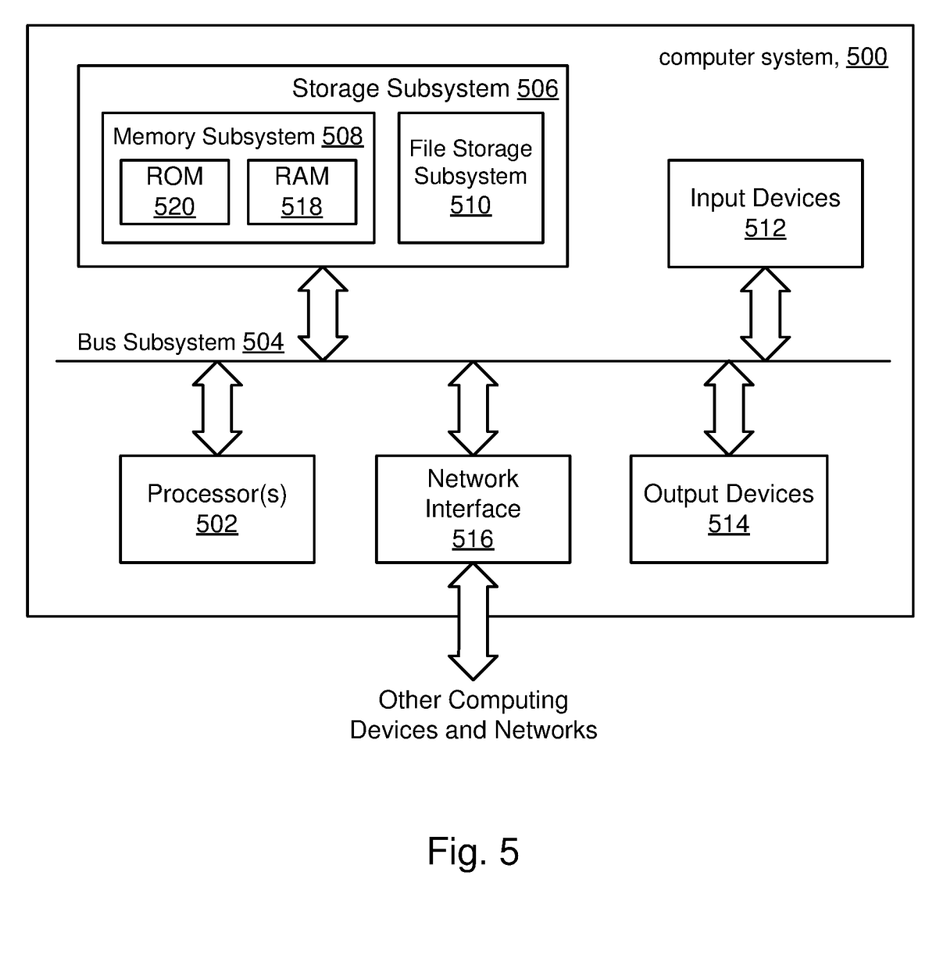
FIG. 5 shows additional details of the computer system of FIG. 1.

FIG. 5 depicts a simplified block diagram of an example computer system 500 according to certain embodiments. Computer system 500 can support execution of the destager process 112 and throttle controller 114 shown in FIG. 1. As shown in FIG. 5, computer system 500 includes one or more processors 502 that communicate with a number of peripheral devices via bus subsystem 504. These peripheral devices include storage subsystem 506 (comprising memory subsystem 508 and file storage subsystem 510), user interface input devices 512, user interface output devices 514, and network interface subsystem 516.

Bus subsystem 504 can provide a mechanism for letting the various components and subsystems of computer system 500 communicate with each other as intended. Although bus subsystem 504 is shown schematically as a single bus, alternative embodiments of the bus subsystem can utilize multiple busses.

Network interface subsystem 516 can serve as an interface for communicating data between computer system 500 and other computer systems or networks. Embodiments of network interface subsystem 516 can include, e.g., an Ethernet card, a Wi-Fi and/or cellular adapter, a modem (telephone, satellite, cable, ISDN, etc.), digital subscriber line (DSL) units, and/or the like.

User interface input devices 512 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 500.

User interface output devices 514 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 500.

Memory subsystem 506 includes memory subsystem 508 and file/disk storage subsystem 510. The disk storage subsystem 510 can include non-transitory computer-readable storage media to store program code and/or data, which when executed by processor 502, can cause processor 502 to perform operations in accordance with embodiments of the present disclosure.

Memory subsystem 508 includes a number of memories including main random access memory (RAM) 518 for storage of instructions and data during program execution and read-only memory (ROM) 520 in which fixed instructions are stored. File storage subsystem 510 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 500 is illustrative and many other configurations having more or fewer components than system 500 are possible.

Many variations, modifications, additions, and improvements are possible. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Conversely, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method comprising:
receiving, by a computer, I/O operations;
storing, by the computer, data in the received I/O operations to a first data store;
destaging, by the computer, a batch of data stored in the first data store, including:
moving the batch of data from the first data store to a second data store to decrease a level of usage in the first data store by a size of the batch of data moved; and
computing a metric based on the level of usage in the first data store; and
varying, by the computer, a frequency of the destaging with each round of destaging based on the computed metric.

2. The method of claim 1, wherein the computed metric is a fractional value between 0.00 and 1.00.

3. The method of claim 1, further comprising delaying an amount of time between successive rounds of destaging to vary the frequency of destaging, the amount of time based on the computed metric.

4. The method of claim 1, wherein the frequency of the destaging is related to the computed metric as a quadratic function of the computed metric.

5. The method of claim 1, wherein varying the frequency of the destaging includes computing a delay time based at least on a product of a base delay time and the metric, and delaying for a period of time equal to at least the delay time before performing a subsequent round of destaging data in the first data store.

6. The method of claim 5, wherein the delay time is equal to a product of the base delay time and the square of the metric.

7. The method of claim 1, wherein the frequency of the destaging is expressed as:

$$\frac{1}{L+Sk^2},$$

where
L is a latency of one round of destaging data from the first data store,
S is a base delay time, and
k is the computed metric.

8. The method of claim 1, wherein the metric is equal to one when the level of usage in the first data store is equal to a minimum value, usage$_{min}$.

9. A non-transitory computer-readable storage medium having stored thereon computer executable instructions, which when executed by a computer device, cause the computer device to:
receive I/O operations;
store data in the received I/O operations to a first data store;
destage a batch of data stored in the first data store, including:
moving the batch of data from the first data store to a second data store to decrease a level of usage in the first data store by a size of the batch of data moved; and
computing a metric based on the level of usage in the first data store; and
vary a frequency of the destaging with each round of destaging based on the computed metric.

10. The non-transitory computer-readable storage medium of claim 9, wherein the computed metric is a fractional value between 0.00 and 1.00.

11. The non-transitory computer-readable storage medium of claim 9, wherein the frequency of the destaging is related to the computed metric as a quadratic function of the computed metric.

12. The non-transitory computer-readable storage medium of claim 9, wherein varying the frequency of the destaging includes computing a delay time based at least on a product of a base delay time and the metric, and delaying for a period of time equal to at least the delay time before performing a subsequent round of destaging data in the first data store.

13. The non-transitory computer-readable storage medium of claim 12, wherein the delay time is equal to a product of the base delay time and the square of the metric.

14. The non-transitory computer-readable storage medium of claim 9, wherein the frequency of the destaging is expressed as:

$$\frac{1}{L+Sk^2},$$

where
L is a latency of one round of destaging data from the first data store,
S is a base delay time, and
k is the computed metric.

15. The non-transitory computer-readable storage medium of claim 9, wherein the computer executable instructions, which when executed by the computer device, further cause the computer device to disable the destaging when the level of usage in the first data store is less than usage$_{min}$.

16. An apparatus comprising:
one or more computer processors; and
a computer-readable storage medium comprising instructions for controlling the one or more computer processors to be operable to:
receive I/O operations;
store data in the received I/O operations to a first data store;
destage a batch of data stored in the first data store, including:
moving the batch of data from the first data store to a second data store to decrease a level of usage in the first data store by a size of the batch of data moved; and
computing a metric based on the level of usage in the first data store; and
vary a frequency of the destaging with each round of destaging based on the computed metric.

17. The apparatus of claim 16, wherein the computed metric is a fractional value between 0.00 and 1.00.

18. The apparatus of claim 16, wherein the frequency of the destaging is related to the computed metric as a quadratic function of the computed metric.

19. The apparatus of claim 16, wherein varying a frequency of the destaging includes computing a delay time based on a product of a base delay time and the square of the metric, and delaying for a period of time equal to at least the delay time before performing a subsequent round of destaging data in the first data store.

20. The apparatus of claim 16, wherein the frequency of the destaging is expressed as:

$$\frac{1}{L+Sk^2},$$

where
L is a latency of one round of destaging data from the first data store,
S is a base delay time, and
k is the computed metric.

* * * * *